June 19, 1934.    N. H. GAY    1,963,842
METHOD AND APPARATUS FOR THE COMPRESSIONAL PRODUCTION OF CAKE ICE
Filed Dec. 4, 1929    5 Sheets-Sheet 1
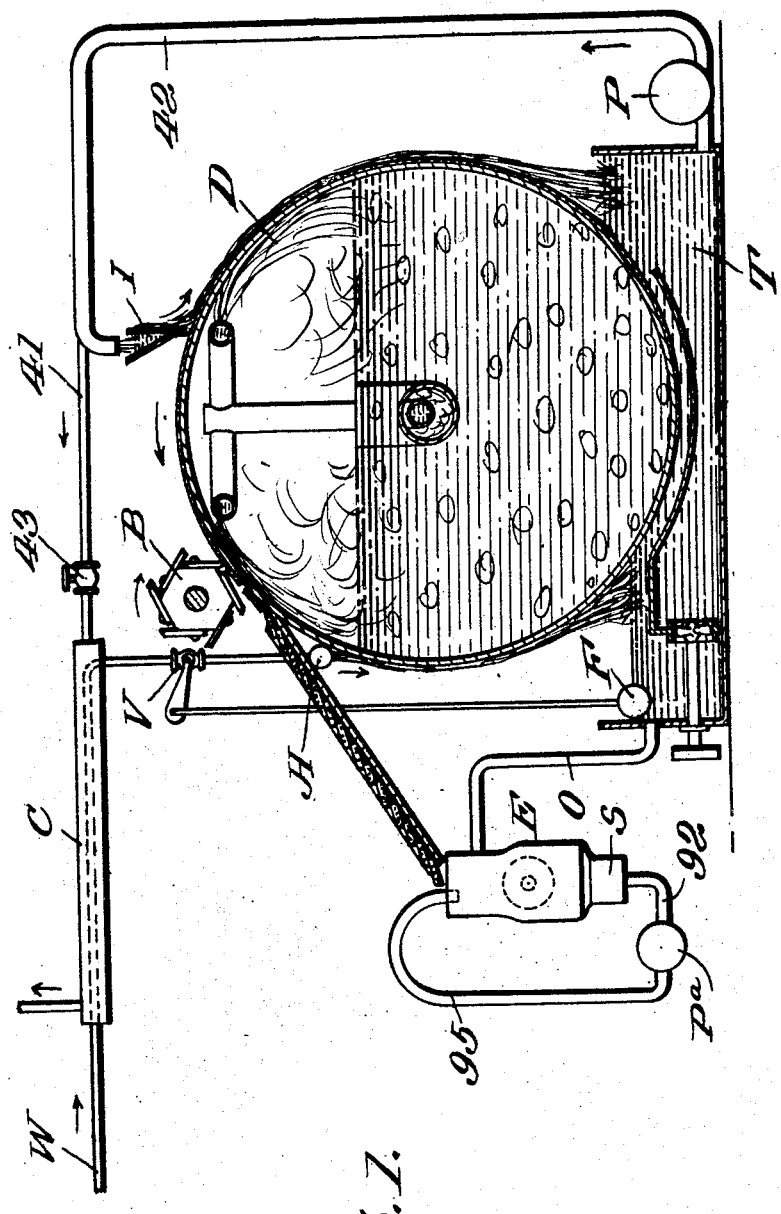
Inventor
Norman H. Gay,
By
Attorneys.

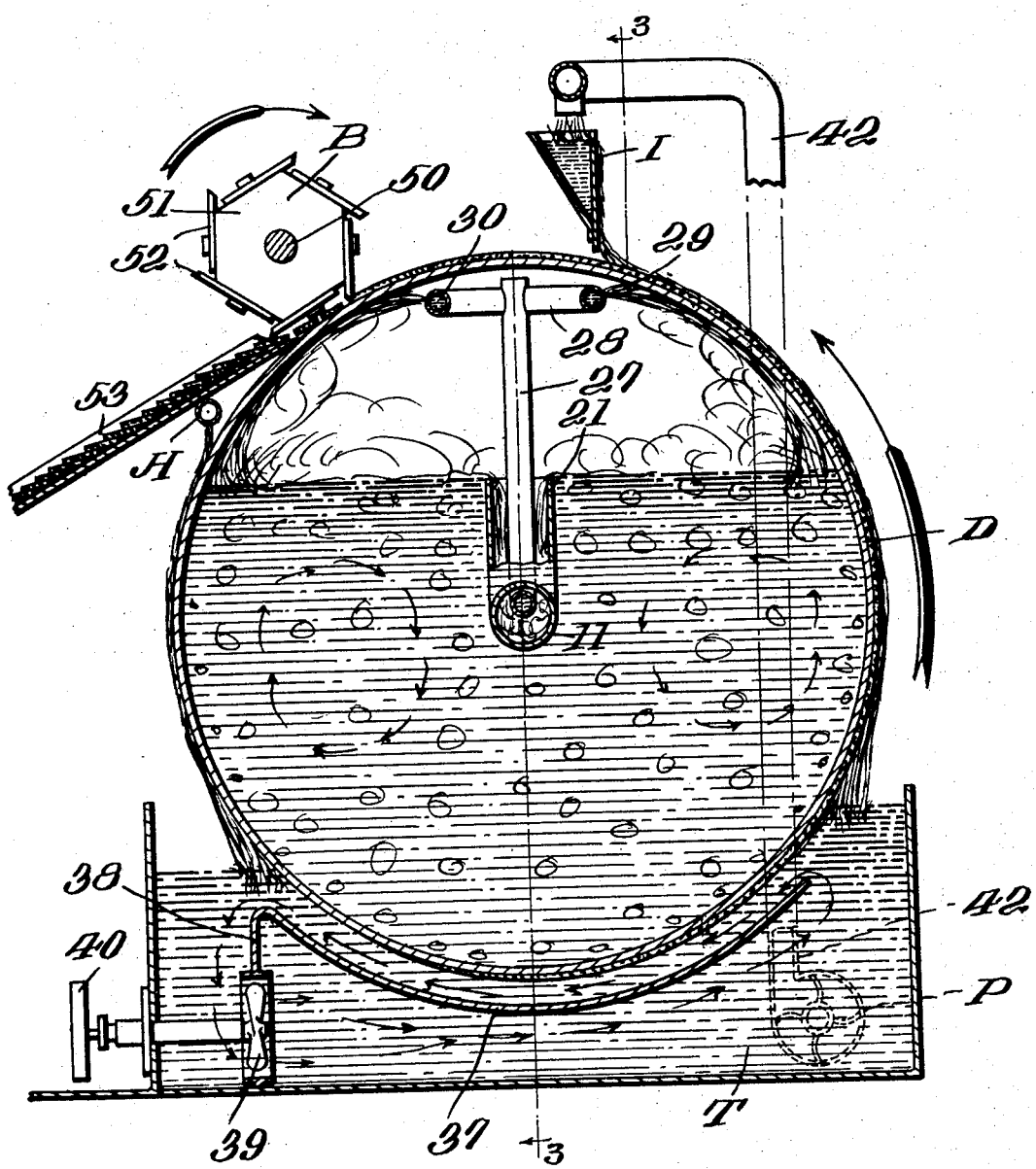

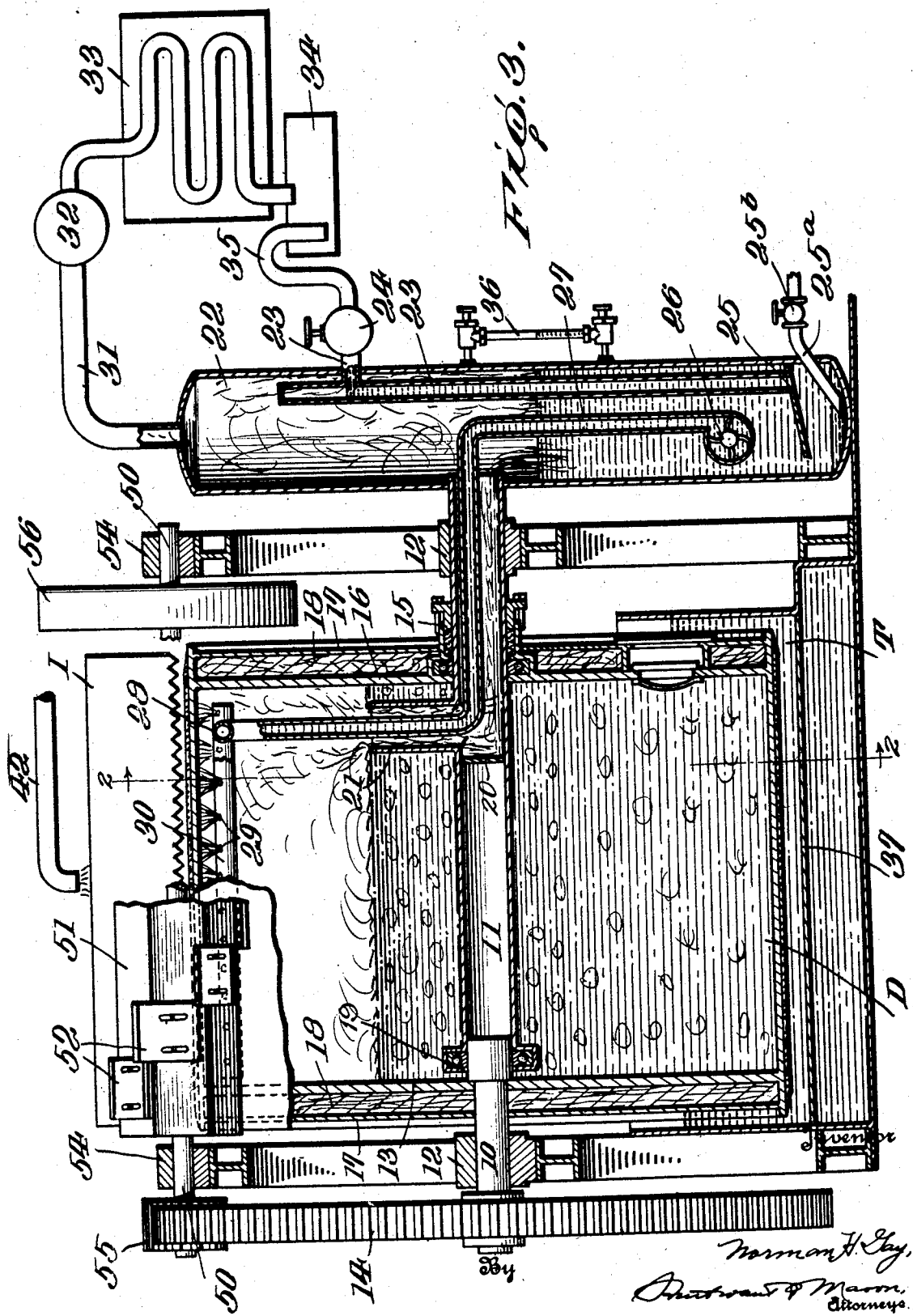

June 19, 1934.　　　　N. H. GAY　　　　1,963,842
METHOD AND APPARATUS FOR THE COMPRESSIONAL PRODUCTION OF CAKE ICE
Filed Dec. 4, 1929　　　5 Sheets-Sheet 4
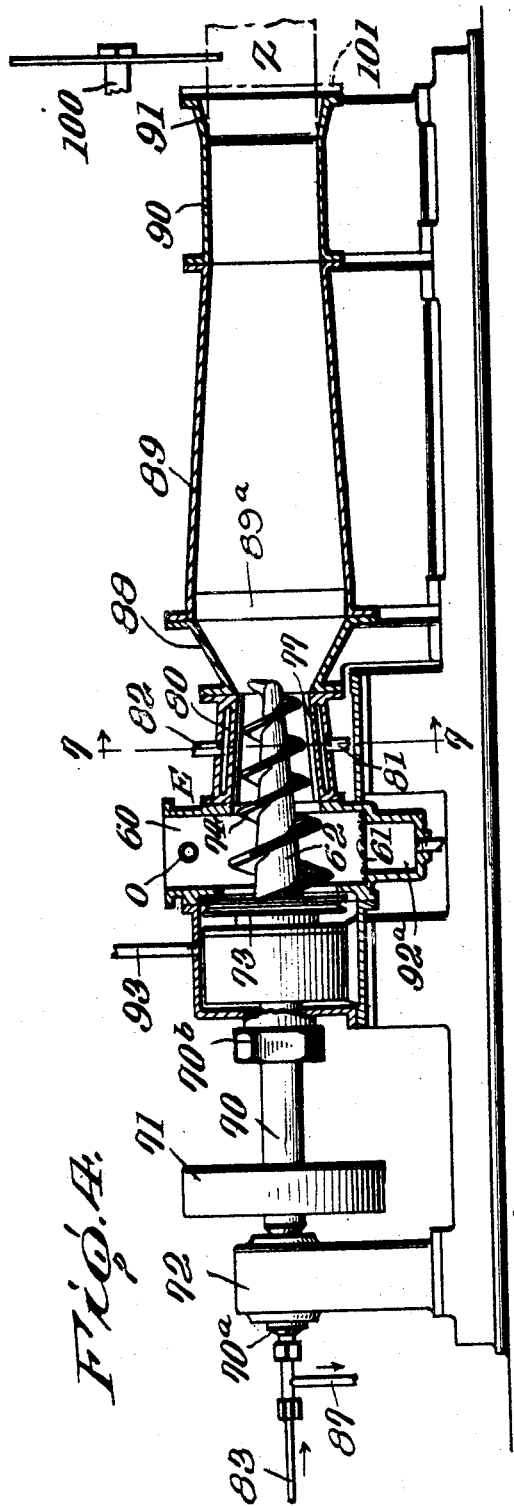
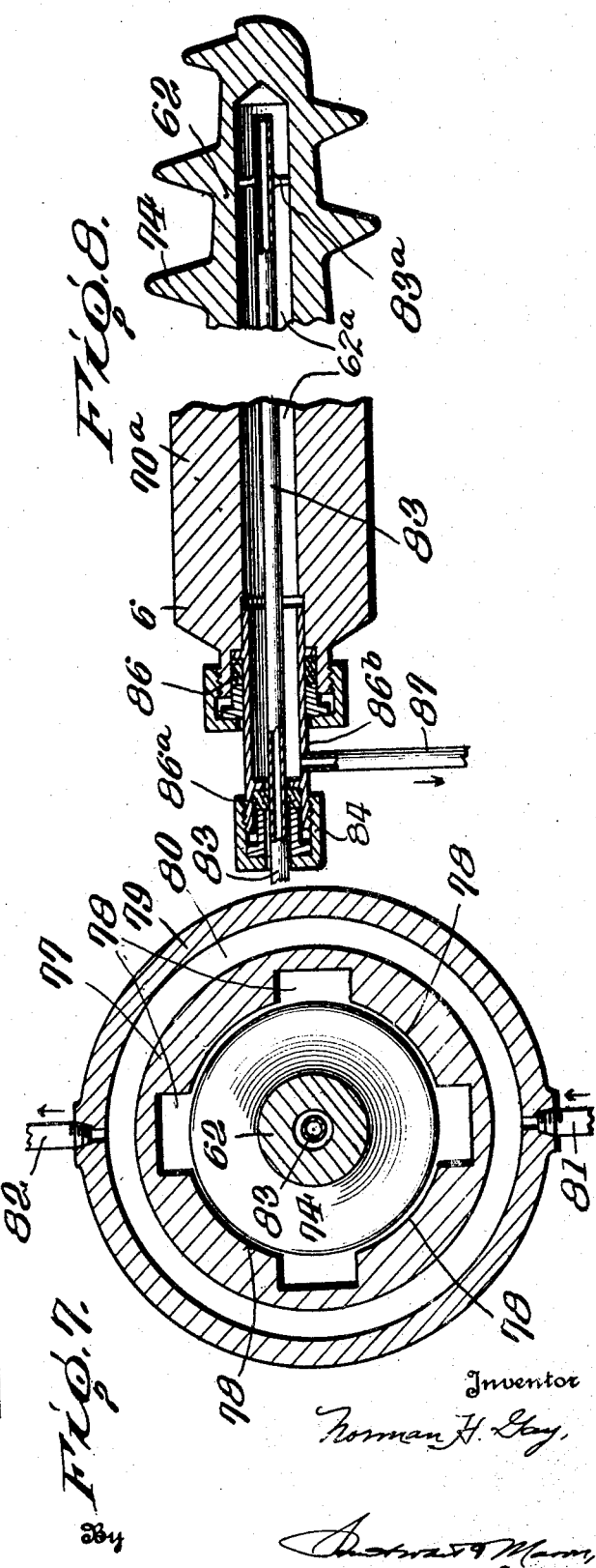
Inventor
Norman H. Gay,
By
Stewart & Mann,
Attorneys.

June 19, 1934.　　　　N. H. GAY　　　　1,963,842
METHOD AND APPARATUS FOR THE COMPRESSIONAL PRODUCTION OF CAKE ICE
Filed Dec. 4, 1929　　　5 Sheets-Sheet 5
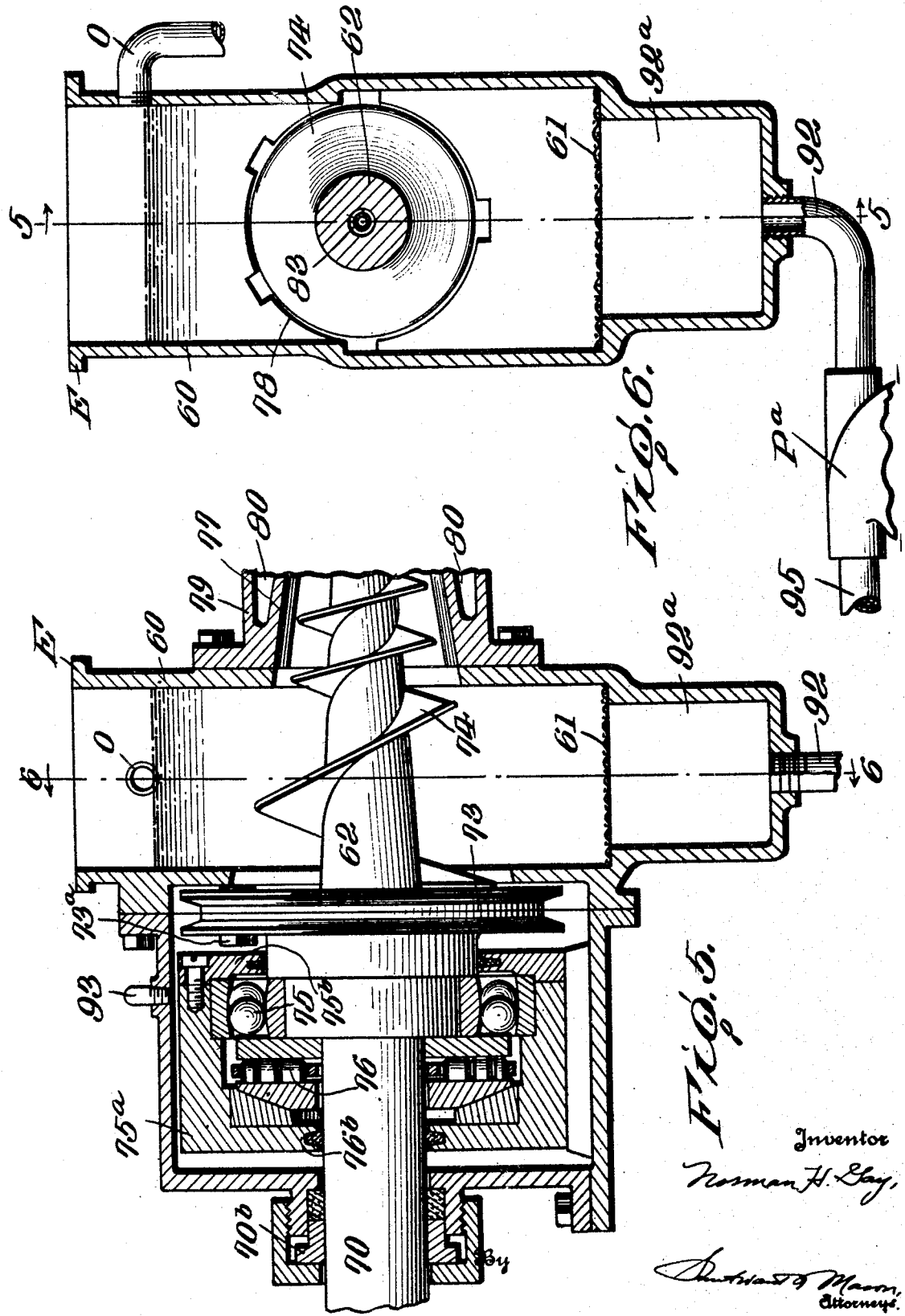

Patented June 19, 1934

1,963,842

UNITED STATES PATENT OFFICE 1,963,842

METHOD AND APPARATUS FOR THE COMPRESSIONAL PRODUCTION OF CAKE ICE

Norman H. Gay, Los Angeles, Calif.

Application December 4, 1929, Serial No. 411,569

37 Claims. (Cl. 62—105)

This invention relates to methods and apparatus for the production of ice by compression means, and is particularly intended for the production of a clear, hard, transparent ice in the form of cakes.

Heretofore, many proposals have been made for the production of ice by compression of ice fragments: but none of these has led to the commercial production of a high grade of either clear or white ice, since they were only competent to produce a low grade of white ice by reason of inherent procedural and mechanical difficulties: or were coupled with so much expense in operation that the ice was far more expensive than that produced by the present can system.

In the can systems employed currently for the manufacture of ice, it is customary to produce a liquid refrigerating medium at a high pressure, and by relieving this pressure to produce a chilling of the medium. The medium is then caused to absorb heat either immediately from the water to be frozen or from a heat transfer fluid such as brine or air, whereby the refrigerant medium is gasified and in the gaseous state is returned for recompression and recondensation: this constituting the refrigerant cycle. The brine or air is then caused to absorb heat from the water to be frozen, and being itself then returned for further cooling. The water to be frozen was contained in cans, and in commercial scale plants a great number of these cans having dimensions of roughly eleven by twenty-two inches in horizontal section were immersed in a brine bath, and were allowed to remain for the requisite time for the freezing of the water contained in them. Air was caused to bubble through this water to sweep away any impurities that might be present in the water and separated therefrom upon crystallization: but in spite of the greatest care, it was oftentimes found that the centers or cores of the cakes were discolored or whitened by the presence of dirt or air bubbles frozen from the water. The freezing of the ice in these cans was slowed down by the high heat insulating effect of the already frozen ice adjacent the walls of the can. Therefore, each ice plant required a very large space for the brine tank, because of this very slow freezing action. Cakes of small dimension were not salable on a commercial scale owing to the difficulties of handling, and the greatly increased liquefaction owing to the greater surface area.

According to the compressional methods of producing ice, however, there is a great saving over the can methods in cost, space, upkeep and time, resulting in a much lower capital expense for a plant of given capacity. With the apparatus according to the present invention, there is no cost of maintenance or supervision during the intervals while the plant is standing idle, and the plant may be rapidly started and stopped to meet the demands of the moment, instead of requiring the constant operation necessitated by the old can systems and many of the heretofore proposed compressional systems. It therefore is not necessary to carry large stocks of manufactured ice, nor to provide the large ice sheds for such stocks. The apparatus according to the present invention is of low weight and encumbrance, may be assembled as a unit and taken from place to place on a truck or similar device and since it is wholly self-contained, may be established for operation by the simple connection of its driving motor system to an electric power net-work. Since the apparatus is capable of producing a clear, hard ice from either treated or untreated water, it is no longer necessary to provide the agitating air required for such cans; nor to provide, when using raw water, the expensive water purifying and treating plants heretofore required for the production of ice in cans. Above all, the present apparatus is characterized by a high thermal and mechanical efficiency, so that in spite of the great advantages resulting from the reduced cost and bulk of apparatus, yet the expenditure for power is not greater than that of a plant operating on the can system, and indeed has been found to be less.

These advantages according to the present invention are obtained by methods and apparatus which have in view the production initially of hard, pure, clear ice, and the maintenance of this ice in this hard, pure, clear condition throughout the operation until it is delivered in the form of a hard, pure, clear bar suitable for being cut into such sizes as may be desired: and in particular the air and other impurities are eliminated once and for all during the freezing of the water initially to form the hard, pure, clear ice, and thereafter are prevented from again entering and discoloring the ice.

Further, to make the plant efficient as a whole, it is necessary that the wastes and losses occurring in the system must be carefully considered and these losses and wastes employed usefully and the thermal units or frigories represented in the same returned to the system. Also, it is essential that the ice as initially made shall be carried forward in its hard, pure, clear condition, as free as possible from any irregularities of surface, and with a minimum possible superficial area, whereby there is less opportunity for the establishing of air bubbles or dirt thereon.

Particularly, it has been found by experiment that while low pressures of compression will result in the production of white ice cakes, yet the product is inferior; and not until pressures of the order of 2000 pounds or more per square inch are employed, is a clear ice obtained. At this pressure, it appears that the normal ice crystals become plastic and lose their rigidity or solidity and may be welded and consolidated into a mass which is homogeneous and uniform. However, the ice block formed at such pressures is subject to uneven pressure strains upon the release of the pressure so that a spontaneous cracking oftentimes occurs, due to unbalanced internal pressure strains; and therefore the present method and apparatus presents a way for the gradual release of this pressure to relieve these strains and with the gradual establishment of normal ice crystals prior to the explusion of the ice bar from the machine, so that the ultimate result is a clear, pure, hard bar of stable ice which may be cut into such lengths and shapes as desired.

It will be understood that by the expression "white ice" is meant an ice which has incorporated therein air pockets or bubbles, and possibly other impurities whereby the product is not transparent, but is whitish in appearance. Commercially, the least appearance of white ice in a cake greatly diminishes the sale value of the cake for residential and similar purposes. By "clear ice" is meant a hard, pure, clear ice which is entirely transparent and is homogeneous and uniform in structure throughout. The present methods and apparatus relate especially to the production of such "clear ice".

With this in view, an illustrative apparatus, by which the method may be practiced, is set forth on the accompanying drawings, in which:

Figure 1 is a diagrammatic view of an assembly according to the present invention.

Fig. 2 is a sectional view on line 2—2 of Fig. 3, of a freezing drum for the production of ice fragments.

Fig. 3 is an axial section of the same, substantially on line 3—3 of Fig. 2.

Fig. 4 is a vertical axial sectional view through the press.

Fig. 5 is a sectional view on an enlarged scale on line 5—5 of Fig. 6.

Fig. 6 is a sectional view on line 6—6 of Fig. 5.

Fig. 7 is a sectional view on line 7—7 of Fig. 4.

Fig. 8 is a vertical axial sectional view, showing the ends of the auger and its shaft.

In these drawings, the apparatus is shown to comprise means whereby a liquid refrigerant is caused to cool one surface of a moving heat transfer member whose other surface is maintained during a major portion of its movement in contact with a rapidly moving sheet of water, whereby the heat exchange surface withdraws heat from the water film immediately adjacent it and causes the deposit of a corresponding film of ice upon the heat exchange member, with an expulsion, from the thin film being formed, of all air, dirt and other impurities contained in this water; such impurities then being washed away by the remaining portion of the sheet of flowing water. This film of ice is built up progressively to a thickness determined by the temperature of the heat exchange surface and its distance of travel in circuit, these quantities being selected for maximum thermal efficiency upon the basis of the insulating capacity of the ice itself. Ultimately, the heat exchange surface is momentarily freed from cooling by the refrigerant, so that it may absorb heat from the unfrozen water on and in the ice and thereby expand. The heat from the surrounding air and from the freezing of the last-mentioned water also operates upon the ice sheet which is formed. By reason, however, of the physical peculiarities of the two materials, the coefficient of thermal expansion of the metal differing from that of the ice, definite disrupting strains are set up in the ice at the contacting surfaces, which tend to cause a complete cleavage and separation between the sheet of ice and the surface of the drum on which it has been deposited. This separated and free sheet of ice is now broken into fragments and delivered as quickly as possible into the extrusion machine which contains pure water at its own temperature, whereby all danger of contamination is eliminated. In particular, the fracturing device for breaking the sheet is of such nature as to avoid the formation of small shavings which have large area and have been found to rapidly absorb impurities.

The ice fragments thus produced are hard, pure and clear, and are transferred to an extrusion press in which they are progressively brought into contact one with another and subjected to pressures of the order of 2000 lbs. to the square inch or more. It has been found experimentally that apparently 2000 lbs. per square inch is a minimum pressure which can be employed at 32° F. for the welding and consolidation of the ice flakes to produce a clear ice, since this pressure appears necessary for the plasticizing of the ice fragments. It will be noted that the water bath employed for receiving the ice fragments and for preventing their contact with air or to the impurities must be pure, and therefore it is preferred that it should be the waste water obtained by the frictional and compressional liquefaction of ice fragments during this plasticizing: this water being pure and of a temperature of 32° F., differing from the ice only with respect to latent heat of fusion.

The plastic mass of ice, which apparently is neither liquid nor solid but in a condition of viscosity intermediate between the two, is then passed through a long nozzle in which the pressure is gradually and progressively relieved so that normal ice crystals are permitted to form, being those which are fundamentally stable at atmospheric pressure. The formation of these crystals is accompanied apparently by a slight expansion in volume of the ice, so that the ice crystals in the nozzle bridge across between the walls and establish a plug to resist the pressure from behind, whereby the above noted pressures may be built up in the compression portion of the nozzle considered as a whole. The squeezing effect on the outside of the bar of ice as it moves forward in contact with the walls is availed of for the melting of the superficial layer of ice adjacent such walls to form water which serves as a lubricant for the extrusion and movement of the ice bar.

Upon issuing from the press, the ice bar may be cut into lengths as desired.

In the drawings, a drum D revolving upon a horizontal axis is cooled by the direct contact of internal liquid refrigerant for a major portion of its area. In an experimental machine this drum has been constructed twenty inches in diameter, and caused to turn at one-half revolution per minute. It is immersed for a few inches in a water trough T, and in addition a spray header H and a water distributing trough I are employed to deliver water to the drum so that water flows over the drum for a major portion of its periphery. A raw water circulating pump P is employed to pass water from the trough T into the distributing trough I: while raw make-up water enters through a supply pipe W and a heat interchanger C and past the regulating valve V controlled by the float F into the spray header H. The ice fragments separated from the drum D by the breaker B are passed by the conveyor A into the extrusion press E which is of auger or screw type, in which the fragments are welded or consolidated together in the manner described above and delivered therefrom in a solid bar, while the water melted from the fragments flows into the ice water sump S and is delivered by the ice water circulating pump Pa for employment in the hopper of the extrusion press E: while an overflow O returns any excess water back to the trough T.

Details of the freezing drum may be seen from Figs. 2 and 3. The drum D in an experimental machine was constructed of steel, with a carefully ground and polished peripheral surface. This surface is preferably covered with a cadmium plating under, for example, the so-called "Udylite" process; or with another material which yields a smooth surface not attacked or clouded by the liquid which is being frozen. The drum D rotates in a counterclockwise direction about the solid shaft 10 and the hollow shaft 11 which are carried in the bearing members 12 of the journal frame or standard. The solid shaft 10 is joined solidly to an end wall 13 of the drum D and carries at its outer end the large driving gear 14: while the hollow axle 11 is fixed to its corresponding bearing and a packed turning joint 15 is provided in the corresponding end wall 16 of the drum. The false heads 17 of the drum hold the insulation jackets 18 in position. It is preferred to provide an internal ball bearing 19 within the drum, relatively between the fixed hollow shaft 11 and the revolving solid shaft 10. It will be noted that the refrigerant pressure on either side of this bearing is substantially the same, so that no packing against the passage of liquid or gas is necessary. The hollow shaft has a closing partition 20 adjacent an upwardly directed overflow or escape pipe 21 which extends upwardly to a point predetermined by the desired liquid level for refrigerant within the drum. The outer end of the fixed hollow shaft 11 is in sealed communication with an accumulator 22 for the refrigerant, which has an inlet pipe 23 for the refrigerant coming from the pressure regulating or so-called expansion valve 24, and opening into the accumulator 22 beneath a baffle 25, so that the incoming refrigerant is rapidly chilled by the amount corresponding to its loss of pressure, and any oil present in it is separated in the oil compartment beneath the baffle 25, while the refrigerant itself moves upwardly into the upper chamber of the accumulator 22, where ultimately it is engaged by an impeller 26 and carried by a pipe 27 into the interior of the hollow shaft 11 and upwardly in the overflow pipe 21 and into a header 28 within the drum: this header opens into two pipes 29, 30 extending parallel to the axis of the drum and having a large number of orifices through which the liquid refrigerant escapes with a small drop of pressure and is projected against the internal surface of the drum D, and runs down on the same and rapidly and quickly cools the surface of the drum, acting as a heat exchange member, to a low temperature. The liquid refrigerant which is not evaporated by this absorption of heat from the drum surface accumulates in the bottom of the drum and establishes a liquid level therein determined by the height of the upper end of the overflow pipe 21, and upon exceeding this level, liquid refrigerant returns through the overflow pipe 21 and the hollow shaft 11 into the accumulator 22 for recirculation by the impeller 26. The entire periphery of the drum D, with the exception of the space between the discharge pipes 29, 30 is therefore maintained at a very low temperature. The gas being formed from the liquid refrigerant within the drum likewise passes downward through the overflow and escape pipe 21 and outwardly through the hollow shaft 11 and enters the accumulator 22 and escapes therefrom through the gaseous refrigerant withdrawal pipe 31 back to the compressor 32 for recompression, and through the condenser 33 for reliquefaction into a receiver 34 from which it is withdrawn and returned by a pipe 35 to the pressure regulating valve 24, thus completing its circulation in the system. The gauge glass 36 enables observation of the level of liquid refrigerant within the accumulator 22 and therewith a determination of the operation of the system. The oil purging pipe 25a opens into the bottom of the accumulator 22 beneath the baffle ring 25 and is controlled by an oil purging valve 25b, by the regulation of which any separated oil may be quickly and accurately removed from the accumulator 22.

As will be noted from Fig. 2, the body of liquid refrigerant within drum D is gradually evaporated at the periphery of the drum, as represented by the bubbles moving upward, the larger portion of these bubbles moving upward in the liquid near the surface of the drum, and thus establishing a double internal circulation of the liquid refrigerant upon and within itself as indicated by the arrows in Fig. 2, thus assisting in the rapid and immediate release of gas from the body of the refrigerant, and maintaining the chilling action at a very high rate of efficiency.

As the drum rotates, its surface passes beneath the spray header H which is supplied with raw make-up water from any suitable source through the pipe W and past the valve V which is regulated by float control F according to the level of water in the trough T: it will be obvious that the flow through this pipe will correspond substantially to the ice removed from the drum D, and hence will be in excess of the quantity of water which can be frozen by the portion of the drum between tne spray header H and the surface of water in the trough T. However, a portion of this water is immediately frozen by the cold surface of the drum D and forms a film of ice thereon. Any dirt, air and other impurities in this water are immediately squeezed out by the crystals in forming, and the film thus becomes very hard, pure and clear. The remaining water from the header H sweeps over the film thus formed and washes such separated impurities along with it, and is rapidly brought to a temperature of 32° F., this cooling having been assisted by heat exchange in the member C (Fig. 1).

The flow of this excess water from the spray header H is very rapid and the washing and cleansing action is very thorough: the water being then received in the trough T. As the drum continues to turn, the progressively formed film of ice increases in thickness as more and more of the water sheet from the spray header H is deposited in the form of ice. Ultimately, however, a particular point of the surface of the drum enters the water in the trough T and travels beneath the water level therein. The trough T has a baffle 37 arranged substantially concentric with the surface of the drum D, to provide a relatively thin stream of water adjacent the drum: and this baffle 37 merges into a vertical partition 38 having an agitator or propeller 39 therein driven by a pulley 40 from the common source of power for the mechanism and serving to produce a rapid movement of water from the left toward the right beneath the baffle 37, and hence back from the right toward the left above the baffle 37, in the latter instance being in contact with the layer of ice forming on the drum, but moving in a countercurrent to the direction of movement of the drum itself. Here again there is a rapid flow of agitating water past the ice being formed so that, as the ice deposits and the dirt, air and other impurities are segregated therefrom, these impurities are rapidly swept away and prevented from adhering to the ice. It will be noted from Figs. 1 and 2 that the liquid level at the left hand side of the respective representation of the drum is lower than that at the right hand side by reason of the operation of this propeller 39, so that a very rapid flow of water is produced from the right toward the left in a countercurrent with respect to the movement of the drum, in the space between the forming ice sheet and the baffle 37.

As the particular point on the surface of the drum D emerges from the water bath in the trough T, it passes upward in a sector in which it is exposed to a downwardly flowing sheet of water from the water distributing trough I which receives water delivered by a pump P from the trough T, this sheet of water likewise flowing in countercurrent to the direction of movement of the ice layer forming upon the surface of the drum, so that here again the layer of ice continues to build up, while the dirt, air and other impurities segregated upon the ice are swept away and carried down into the trough T.

As shown in Fig. 1, a branch pipe 41 from the conduit 42 connecting the pump P and the water distributing trough I permits the escape of a portion of the water being pumped through this conduit 42 into the outer jacket of the illustrated heat exchanger C, in which its frigorific values are recovered, and absorbed by the entering raw water supply in pipe W: the proportion of water thus permitted to escape is regulated by a control valve 43. It may be noted at this point that the quantity which is permitted to escape depends upon the relative purity of the raw water entering through supply W. If the water contains only very soluble salts and impurities such as mineral and organic impurities, for example, only a small percentage need be permitted to escape through the pipe 41. At no time should the concentration of such matters in the trough T be so great as to cause any sedimentation or crystallization therein of the impurities.

It will be noted that the sheet of water flowing from the distributing trough I encounters the periphery of the drum D at a point immediately above the liquid refrigerant distributing pipe 29, and that after a particular point of the drum D moves past the pipe 29, it receives neither refrigerant nor water on its respective sides. The layer of ice on the drum, however, is still wetted to some extent with water which is not yet frozen, and also is exposed momentarily, for a time represented by the travel from opposite the pipe 29 to a point opposite the pipe 30, to come in contact with the atmospheric air, which is at a temperature above that of the ice layer. Both the layer of ice which has deposited and the drum D itself absorb the latent heat given up by the continuation of the freezing of the water on and in the ice and from the atmosphere at this point, and as a result of the physical characteristics of the two materials, the coefficient of thermal expansion of the metal differing from that of the ice, definite disrupting strains are set up at the contact surfaces, which tend to cause a definite cleavage between the sheet of ice and the surface of the drum upon which it has been deposited. The ice, however, remains a coherent sheet, and passes along with the drum. This heating has not been sufficient to produce any substantial liquefaction of the ice, but rather, since it occurs at a temperature below 32° F., tends to a freezing of the water contained in the ice, thus drying the ice and forming a clear crystal ice sheet from the somewhat wet ice which emerged from under the water spray. For assuring an absolute dryness and brittleness of the ice, the pipe 30 is located at a point such that its jets of liquid act upon the drum D to produce such a, so to speak, super-chilling of the ice sheet.

This ice then moves beneath the chopper device mounted on a shaft 50 and having a revolving member 51 thereon receiving the chopper blades 52, which strike the ice sheet adjacent its advancing edge and at a considerable angle, whereby they chip off the ice flakes and cause them to be projected into a chute 53. It will be noted from Fig. 3 that the blades 52 are preferably staggered with respect to one another: and are arranged in such manner and relationship that the ice fragments are cracked into the form of flakes or chips preferably about a half inch by six inches in size, and of a thickness of about one-eighth of an inch. It has been found that this thickness is adapted for the very efficient cooling, without excessive losses by the insulating effects of the ice layer already deposited upon the exterior of the drum D; this thickness may be increased or decreased as desired and as found efficient in a particular machine and in a particular operation, by decreasing or increasing the speed of rotation of the drum and increasing or decreasing the relative difference in temperature between the freezing water and the working temperature of the refrigerant. The shaft 50 is mounted on bearings 54 of the frame, and is provided at one end with a pinion 55 engaged with the gear 14 of the drum D: while at its other end it is provided with a means 56 for operation from any suitable source of power. Suitable means are likewise provided for the driving of the impeller 26, the agitating propeller 39 and the freezing water circulating pump P.

The ice fragments in the chute 53 are led directly to the hopper of the extrusion press, in which is maintained a bath of water at 32° F. delivered by the ice water circulating pump Pa, and are carried downward in this hopper into the press chamber 60 of the extrusion press E.

The extrusion press E comprises a powerful shaft 70 having a driving pulley 71 thereon and mounted in the rear bearing 72 (Fig. 4), and connected at its front end by flanges 73 to the worm or auger spindle 62 which has either a single or multiple thread of constant or variable pitch and with conical, cylindrical, etc. limiting surface. Between the flange 73 and the pulley 71, the shaft is provided with a radial ball bearing 75 and a thrust bearing 76 to take up the great pressures here employed. Any water which passes backward around the flanges 73 establishes a level in the casing equal to that in the water bath chamber around the large end of the auger, but is free to escape through an outlet pipe 93: while the bearings themselves are protected against access of this water by suitable packings 75b, 76b.

The hopper and water bath chamber 60 are located immediately in front of the flanges 73, and hence the ice fragments, always maintained in their clear, hard, pure condition and without melting by immersion in the aforesaid bath of ice water at 32° F., are brought into contact with the worm 62, 74 adjacent its rearward end of maximum diameter and greatest pitch. The ice flakes are engaged by this worm and swept forward and matted or felted down and subjected to progressively increasing pressures. To assist in this, the barrel 77 surrounding the forward end of the auger 74 is provided with flutings or riflings and may be surrounded by a jacket 79 having an annular chamber 80 through which a liquid may be passed from an inlet pipe 81 to an outlet pipe 82, to maintain the auger barrel at the desired temperature.

Also, the auger 62 itself may be hollow and receive a pipe 83 through which water at a desired temperature may be forced, this pipe being guided by the spider legs 83a near its forward end, and having apertures for admitting the water into the hollow space 62a within the auger 62. The water returns through this hollow space 62a through a rotatable liquid tight connection 84 to the stationary end connection 70a and thence is discharged through a pipe 87. Suitable packings 86, 86a are provided between the end 70a and the casing 86b, and between this casing 86b and the inlet pipe 83 (Fig. 8).

The auger 62 and its barrel 77 are constructed and arranged by correlation of their diameters to the pitch of the threading 74 so that a greater and greater compression is exerted upon the ice flakes as they progress forward in the machine. Adjacent the end of the auger is a reversely or divergently tapered section 88 leading to a further convergently-tapered nozzle portion 89 which is of considerable length and slow convergence, and merges into a nozzle portion 90 of substantially uniform cross section (hereinafter referred to as "prismoidal"), with the outwardly flared end 91. The several parts of the hopper, barrel, connection and nozzle are made to withstand internal pressures of the order of several thousand pounds per square inch of cross section of the mass contained within them.

A space 92a is provided in the press sump S below the screen 61, into which the water in the press may flow and pass by pipe 92 into the pump Pa (Fig. 1): which in turn delivers this portion of the pure water by a pipe 95 back into the top of the water bath chamber 60 to maintain the ice flakes flooded. The water bath in the chamber 60 has an overflow O returning the excess water, which is very pure as it is in effect water of melting from the ice, to the immersion tank T: and it will be understood that a similar disposal may be made of the water from pipe 93. It will be noted that a liquid level is maintained in the etrusion press E sufficient to keep all air out of the press and to permit maintaining a body of ice fragments in the chamber 60 which may fill this chamber both above the overflow opening and down to the screen 61.

In operation, as the auger 62 turns in the mass of ice fragments, they are pushed forward into the barrel 77 and by the flutings or riflings 78 thereof are held against relative rotation with the auger, so that the auger continues to advance them and push them against the already present mass of fragments contained in the nozzle and connection member 88. The pressure is built up to a maximum of more than 2000 pounds to the square inch, a preferred pressure being between 2200 and 2300 pounds to the square inch. At this pressure, the ice fragments are made plastic and weld together into a homogeneous and uniform mass of compressed ice. This welding together may be considered as due to the phenomenon of regelation: the freezing or melting point of ice is lowered approximately 1° F, for each 1000 pounds per square inch increase in pressure, so that when the pressure is built up by several thousand pounds per square inch, the melting point is correspondingly lowered several degrees. Under the pressure of the auger, the ice fragments are brought into compressional contact under such a pressure, so that they are partially liquefied even at the low temperature prevailing and the water produced receives the necessary heating from the lowering of the temperature of the adjacent remaining ice, thus lowering the temperature of the portion that remains ice. The maximum pressure in the system appears to be at the front end of the auger: here, the ice from the auger is forced into the main body of the ice in the connection 88 and nozzle portion 89, under the great pressure prevailing, and results in the production of a soft plastic ice body at this point produced by the compressional liquefaction at below the normal freezing point. As the ice moves away from the auger, the pressure decreases and correspondingly the freezing point of the water rises, so that this water "regeals" from the "supercooled" condition in which it has been existing. Thus the ice fragments are bound or welded together into a solid and uniform mass by this freezing of the compressional water. As the ice progresses through the nozzle 89, 90, the pressure continues to be relieved gradually and the plastic ice mass becomes a definite solid, assuming a crystalline form which is stable at normal pressures. The outside of the ice mass is subjected to a squeezing action due to the convergence of the nozzle, which permits the establishing of the necessary back pressure, and causing a meltage by reason of the compression. Water of meltage thus formed serves to lubricate the walls of the nozzle as the ice is pushed through it. The resistance offered by the nozzle 89, 90 to the movement of ice through it is sufficient to establish a back pressure balancing that exerted upon the ice in the connection 88 to produce the aforesaid plastic spot. Finally, the ice bar is brought to a size and cross section determined by the prismoidal portion 90 of the nozzle, and issues from the flared end 91 thereof as a consolidated bar of hard, pure, clear ice of the desired quality. It will be understood that the use of the long nozzle of great resistance permits the obtaining of the necessary back pressure for the production of a high grade of clear ice by preventing the disruptive or explosive change of state referred to above. With a shorter nozzle of lesser resistance, a white ice can be made, with a correspondingly lesser consumption of power.

The bar of ice may now be severed into blocks of any desired length as, for example, by the use of a severing means such as the saw 100, impact blades, etc.

The entire time taken from the entry of the water from the main pipe W until it is extruded as a bar of ice Z is relatively short, so that the plant may be set in operation and within ten or fifteen minutes thereafter, the ice masses within the connection 88 and the nozzle portions 89, 90 are built up sufficiently for the production of a bar Z. It will be understood that for this initial building up, it is preferred to block the nozzle portions 90, 91 by some suitable closure 101 which is removed as soon as the pressure and operation of the machine indicate that resistance sufficient for the production of the plasticizing has been established.

It is found in operation that a continuous movement of the ice fragments along the auger and through the connection 88 and nozzle portions 89, 90 is necessary for the continuous operation of the machine. As this movement becomes too slow or stops, the ice fragments tend to shear off between the lands 78, and to build up a solid mass of ice upon the auger, which then turns as a cone or cylinder and without producing any pressure upon the ice mass in the connection 88 and nozzle portions 89, 90. When this occurs, the ice in the barrel 77 and around the auger and lands is melted by the passing of warm water through the jacket 80 and the pipe 86, 83 until the auger is ready and competent to continue the advancing and building up of the requisite pressure for the advancement of the ice mass within the connection 88 and nozzle portions 89, 90.

To shut down the plant normally, it is merely necessary to interrupt the operation of the freezing drum as, for example, by discontinuing the operation of the compressor, etc., and by withdrawing the water from the trough T and shutting off any access of water thereto. To restart the plant, the drum and pumps are again set into motion, and liquid refrigerant is admitted in sufficient quantity to establish a liquid level in the drum D and the water supply renewed for the several discharges from the supply header H and the water distributing trough I. Warm water may also be admitted into the auger and the jacket 80 as above set forth, and as the fresh ice fragments come forward they are fed in and compacted against the end of the ice mass in the connection 88, 89 until the liquid plasticizing pressure is reached. It will be noted that the point of maximum pressure regulates itself according to the condition of operation of the plant: since if a greater pressure is exerted by the auger 74, the transverse plane of maximum pressure moves relatively forward and toward the right in Fig. 4, and the extrusion bar Z is ejected more rapidly: while if the pressure is lower, the maximum plane moves slightly backward or toward the left in Fig. 4 and the extrusion is slower. There is, however, a limit to this automatic adjustment determined by the necessity of the progressive and gradual release of the plasticizing pressure within the remaining portion of the nozzle portions 89, 90 in order to avoid the formation of surface cracks in the ice; on the one hand: and the danger of freezing in the auger on the other hand. A particular auger which has been found easily adapted for the purpose is of the design shown, being about twelve inches long and having an initial pitch of two inches decreasing regularly to a pitch of one and one-half inches; and being constructed with a radius of four inches at its major diameter and of one and one-half inches at its front or minor diameter. The interior of the barrel 74 for the purpose is circular in section and the flutings or riflings project to within one-eighth inch of the path of the auger thread: while the rifling is one-quarter inch deep by one and one-half inches wide. The compression section 88 is made circular in shape and blended by a small transition portion 89a with the nozzle portion 89 which is of square section. The minor diameter of the concentric connection 88 is five inches, its major diameter seven inches and the length three and one-quarter inches. The transition portion 89a is five and one-quarter inches long, to seven inches square and then enlarged to ten inches square in twelve inches: while the nozzle portion 89 proper is ten inches square adjacent the discharge 89a and tapers to six inches square at its smaller or forward end: the nozzle section 90 being six inches square throughout and six and one-half inches long, while the flare 91 is three inches long.

These precise dimensions have been set forth as indicating the size and dimensions of a plant competent to produce high quality clear ice on a commercial scale. It may be indicated as a matter of power efficiency that about fourteen kilowatt hours of electricity was actually expended upon the ice in the compression and extrusion: the power losses in the motor and other points running around 20%. It was likewise found in the plant used as an illustration that about 20 kilowatt hours per ton were required to freeze the ice, including the power for removing the ice from the drum and delivering it into the press. Therefore, about 34 kilowatt hours of electrical energy were required in the experimental plant for the production of one ton of clear ice.

It will be noted that the dimensions of the plant are far less and take up much less area than heretofore required even for the auxiliaries of the ordinary can system: so that there is a great saving in building space and capital cost, and an especial advantage is the fact that the plant may be quickly and immediately shut down and restarted as desired.

Also, there is a saving in the labor for handling the ice, in comparison to the requirements of the can systems: while at the same time delivering from an impure raw water a superior article: and one which has not been heretofore made on commercial scale by compression machinery.

It is obvious that while the combination of the several parts has been set forth as constituting an apparatus adapted to a method of producing hard, pure, clear ice, the same structures may be independently employed for other purposes. Thus the freezing drum may be employed for the congelation of fruit juices as a whole, or for the freezing of a portion of the water content thereof in condensing them: likewise, the extrusion press may be operated under conditions not involving the high pressures required for the production of the clear ice, resulting in the manufacture of a relatively larger quantity of a "white" ice at the same cost in power and time.

Further, it is obvious that the invention may be practiced in other ways than the specific em-

What I claim as new and desire to secure by Letters Patent is:

1. The method of producing hard, clear ice fragments which comprises the formation of a sheet of ice upon a moving cold member, interrupting the cooling of said member at a predetermined point in its travel, again establishing a chilling of said member and the sheet of ice in contact therewith, and then cracking the sheet of ice into fragments.

2. The method of producing a hard and clear sheet of ice which comprises subjecting one side of a heat exchange member to the action of a cooling medium, moving the member progressively forward, and immersing the member during a part of its travel in a body of water moving rapidly in countercurrent to the direction of movement of said member.

3. The method of producing hard and clear ice fragments which comprises producing an ice sheet by the method set forth in claim 2, and cracking the ice sheet thus formed while out of contact with the body of water.

4. The method of operating a freezing drum which comprises subjecting the exterior thereof to contact with water for a major portion of its periphery, projecting a liquid refrigerant against the inner wall of said drum, establishing a body of refrigerant in the body of said drum, and permitting the evaporation of the refrigerant within the drum to establish a circulation within the body of such liquid upwardly adjacent the inner surface of the drum and downwardly adjacent the vertical axial plane of the drum.

5. The method of producing a bar of hard and clear ice from a mass of ice fragments which comprises establishing a body of ice and progressively bringing the ice fragments against the body under a pressure of more than 2000 pounds per square inch whereby to compress the ice fragments into a hard and clear mass of ice, gradually advancing the mass of ice as it forms, and gradually relieving the pressure thereon as the mass advances whereby a crystal formation is produced which is stable at normal pressure, while maintaining a back pressure along the mass for preventing a disruptive change of state.

6. The method of producing a bar of hard and clear ice from ice fragments which comprises compressing the ice fragments until they are plastic, and gradually relieving the pressure thereon to permit the slow formation of ice crystals which are stable at normal pressure, while maintaining a back pressure along the mass for preventing a disruptive change of state.

7. The method of producing a bar of hard and clear ice from ice fragments which comprises compressing the ice fragments under a pressure in excess of 2000 pounds per square inch, and thereafter gradually relieving the pressure upon the body of ice fragments whereby to permit the slow formation of ice crystals which are stable at normal pressure, while maintaining a back pressure along the mass for preventing a disruptive change of state.

8. The method of producing a bar of hard and clear ice from ice fragments which comprises compressing the ice fragments to a pressure of substantially 2200 pounds per square inch, and gradually thereafter relieving the pressure on said body of ice fragments whereby to permit the slow formation of ice crystals which are stable at normal pressure, while maintaining a back pressure along the mass for preventing a disruptive change of state.

9. In an ice making apparatus, a rotating drum having means to cool the same, means to pass water over the major portion of the peripheral area of the drum whereby a progressively thickening sheet of ice is formed thereon, means to break the ice sheet into fragments, means to convey the ice fragments into a water bath, a press submerged beneath the level of said bath and adapted to compress the fragments into a consolidated bar of ice, whereby a portion of the ice is liquefied to form water, means to return the excess of water from said water bath for freezing on said drum, and means to deliver said water to said conveying means whereby to assist the movement of said ice into said press.

10. In an apparatus for producing ice and comprising in combination a means for producing ice fragments and a means for consolidating the ice fragments with a partial liquefaction thereof to form water, a conduit for conveying the ice fragments from said producing means to said consolidating means, and a pump for bringing said water of compression into said conduit to assist the movement of the ice fragments from said producing means to said consolidating means.

11. Apparatus for producing ice comprising a rotatable drum, a hollow shaft for the drums having a relatively rotatable packing joint therewith, an accumulator, means to admit liquid refrigerant into said accumulator and to withdraw gaseous refrigerant therefrom, means to deliver liquid refrigerant from the interior of said accumulator into said drum, and means opening into said accumulator at the liquid level therein and opening into the gas space in said drum to permit the return of gasified refrigerant from the drum to the accumulator and a return in circulation of liquid refrigerant between said drum and said accumulator.

12. Apparatus as in claim 11, in which a pump is employed to move the liquid refrigerant from said accumulator into said drum so that a positive circulation of liquid refrigerant is established from the accumulator to the drum and back again.

13. Apparatus as in claim 11, in which a pump is employed to move the liquid refrigerant from said accumulator into said drum, and supply pipes are employed for directing the pumped refrigerant liquid against the upper surface of said drum.

14. In an apparatus for producing a sheet of ice comprising a rotatable drum, a bottom trough adapted to contain water in which said drum may be immersed for a portion of its periphery, a spray header pipe for delivering water on said drum to flow downward over the periphery of said drum into said bottom trough, a water distributing trough to deliver water onto said drum so that the water may flow down over another portion of the periphery of said drum and into said trough, a pump to take water from said bottom trough and deliver it to said distributing trough, a raw water supply pipe connected to said spray header, a float in said bottom trough, and a valve controlled by said float to regulate the admission of water into said spray header.

15. An apparatus for producing a sheet of ice comprising a rotating drum, a trough adapted to contain water in which said drum is immersed, a baffle plate in said trough substantially concentric with the periphery of said drum whereby to present a thin sheet of water adjacent the periphery of the drum, and water propelling means adapted to force water between said baffle and said drum in a rapidly moving current.

16. An ice making apparatus for producing a bar of ice from ice fragments comprising in combination means for establishing a water bath and to bring the ice fragments into said water bath, an auger submerged in said water bath and adapted to convey the ice fragments forward therein and compress the same for consolidation wherewith the water is squeezed from among the same, and a nozzle to receive the compressed ice fragments and including a gradually converging delivery portion and a portion whose walls are parallel wherein the pressure on said mass of compressed ice fragments is permitted to be gradually relieved whereby to permit the gradual formation of ice crystals which are stable at normal pressures and which ice crystals bridge across the converging portion of said nozzle whereby to establish a back pressure sufficient for the compression of the ice fragments.

17. Ice making apparatus for forming a consolidated bar of ice from ice fragments comprising an auger, means to deliver ice fragments to said auger, a barrel surrounding said auger and cooperating therewith to compress the ice fragments, and a nozzle to receive the ice fragments upon said auger and barrel, said nozzle being of greater cross sectional area than the area of said auger and barrel whereby the auger may be given a great number of rotations for the delivery of sufficient ice fragments to fill a unit length in said nozzle and thereby prevent itself from being frozen solidly into the mass of ice fragments.

18. An apparatus for producing ice, comprising a barrel and an auger movable in said barrel, and means to warm the surfaces in contact with the ice to a temperature above that of the congealing point whereby to free the same from the ice.

19. An apparatus for producing ice including a hollow auger, and means to introduce water into the interior of the auger to warm the same above the congealing point of the ice.

20. An apparatus for producing ice comprising an auger and a barrel surrounding the same, said barrel having a water jacket whereby its internal surface may be heated to above the congealing point of the ice.

21. An apparatus for producing ice comprising, in combination, an auger and a barrel surrounding the same, said barrel having lands extending in the longitudinal direction thereof, a jacket surrounding said barrel and means to introduce a heating fluid between said jacket and barrel whereby to warm said lands and thereby free the same from ice which has congealed fast thereto.

22. In an apparatus for producing ice, a barrel, an auger cooperating with said barrel and comprising an auger portion and an extending shaft portion, ball bearings for said shaft portion located adjacent the auger portion, a casing surrounding said ball bearings, said barrel being provided adjacent the shaft with a water bath chamber to receive ice fragments for the production of the ice by the action of the auger and barrel, and means located around said shaft to prevent the escape of water from said chamber into contact with said bearings.

23. An apparatus as in claim 22, in which the auger and shaft are separate and are each provided with flanges and means are provided for securing the flanges together, said flanges constituting a closing plate to limit the passage of water from said chamber into said casing.

24. Apparatus for producing ice, comprising a rotating drum, a trough containing water in which the drum is partly immersed, a pump to take water from the trough and raise it, a distributing device located above the axis of the drum and adapted to receive water from said pump and cause it to flow in a sheet over the periphery of said drum, means for permitting a portion of the water from the pump to escape, a heat interchanger through which the escaping water passes, means to admit raw water to the heat interchanger for heat exchange with the escaping water, a valve controlling the flow of said raw water, and a float operated by the liquid level in said trough to actuate said valve.

25. A method of manufacturing clear ice consisting in compressing ice particles together while excluding air therefrom, increasing the pressure sufficiently so that, upon a subsequent gradual release of pressure, a clear mass of ice will be produced, and thereafter gradually releasing the pressure on the mass at such a slow rate of decrease that the back pressure at all points of the mass prevents a disruptive change of state.

26. A machine for making clear ice comprising means for receiving ice particles and excluding air therefrom, means providing a passage having a constriction intermediate thereof, and means for forcing the ice particles from the receiving means into the passage and whereby to develop pressure upon said particles which is built up to a point sufficient so that upon a subsequent release of pressure a clear mass of ice will be produced, the passage on the other side of the constriction being of divergent form slowly to release said pressure existing adjacent the constriction.

27. The method of producing hard clear ice fragments which comprises causing water to flow upon the outer surface of a hollow rotating drum at points removed from the top thereof, cooling said drum by projecting a liquid refrigerant against the inner surface thereof at points removed from the top thereof, so that neither liquid refrigerant nor water encounters the top of the drum, and separating the sheet of ice from the drum at a point between the top and the nearest point of water contact encountered by the drum during its rotation.

28. The method of preparing a bar of clear, hard, transparent, homogeneous ice, which comprises preparing hard, clear, ice fragments, arranging the fragments in a column and excluding air therefrom, and subjecting each point in the column to increasing pressure whereby to render the fragments plastic at such point, and thereafter subjecting such point to a slowly and progressively decreasing pressure while maintaining a back pressure at all points of the mass sufficient to prevent a disruptive change of state thereat whereby to effect consolidation of the plastic fragments without explosive change of state of the mass after plasticizing.

29. The method of preparing a clear, hard, transparent, homogeneous ice, which comprises preparing hard, clear ice fragments, arranging the ice fragments in a column in the presence of a bath of pure water at 32° F. for excluding air from the ice fragments, subjecting each point in the column successively to an increasing pressure while permitting the escape of water until a maximum pressure is reached at which the ice fragments are plastic at such point and thereafter subjecting such point to a slowly and progressively decreasing pressure while maintaining a back pressure at all points of the mass sufficient to prevent a disruptive change of state thereat, whereby to effect consolidation of the plastic fragments without explosive change of state of the mass after plasticizing.

30. The process of forming ice chips consisting of applying to one face of a member a refrigerant, and to the opposite face thereof a sheet of water, agitating the water in the sheet while congealing for removing entrapped air and impurities therefrom, moving the member until a portion having ice thereon is free of the sheet of water, and subjecting the frozen sheet of ice on said portion to impact blows for forming and discharging ice chips from the member.

31. An apparatus for producing a sheet of ice comprising a revolving drum, means for cooling the major portion of the surface of said drum, and water delivering devices for passing water onto said drum at a plurality of points each removed from the top of the drum so that the water flows downward over the drum and the top of the drum is substantially free of water.

32. An apparatus as in claim 31, in which two of the water delivering devices comprise spray pipes located at each side of the top of the drum, and an ice breaking device is located adjacent the top of the drum between said two water delivering devices.

33. An apparatus for producing ice fragments which comprises a rotatable drum, means for rotating the drum in one direction, means to supply water to the surface of the drum at a plurality of points removed from the top of the drum whereby the water may flow downward over the surface of the drum to freeze thereon and to sweep away impurities, and a breaking device for the sheet of ice located between the top of the drum and the first water supply means encountered by each drum element as it passes from the top in rotation whereby no water is supplied to the drum between the top and the breaking device so that impurities are not carried forward with the ice broken by said device.

34. An apparatus for producing a bar of ice from ice fragments which comprises a convergently walled conduit into which the fragments may be introduced, means for exerting a high pressure upon the fragments at the larger end of said conduit whereby to advance them in the conduit and whereby they are in plastic condition upon arrival at smaller end thereof, and means comprising a divergently walled conduit connected to the smaller end of said convergently walled conduit for permitting the slow and gradual release of said pressure so that the plastic ice is transformed into a homogeneous bar in crystalline condition stable at normal pressure.

35. In an apparatus for freezing liquids, a drum, means to admit liquid refrigerant into said drum and to permit the escape of gaseous refrigerant therefrom, a liquid delivering device located externally of the drum at a point angularly removed from the top thereof for passing the liquid to be frozen onto each element of the outer surface of the drum as the element passes toward the top while leaving a portion of the drum surface between said device and a point beyond the top free of contact with liquid, means for delivering through said device onto said drum and quantity of liquid greater than that which can be frozen by the drum whereby to provide a constant flow of liquid to wash away materials separated from the liquid during freezing, and means for removing the frozen sheet located angularly removed from the top of the drum in the direction of movement of each drum element as it passes from the top and opposite the external surface of the drum which is free of contact with the liquid.

36. The process of forming clear ice consisting in cooling a rotatable cylindrical surface, rotating the surface, supplying to the surface throughout a greater portion thereof a moving layer of water while leaving a space free of water whereby to form progressively a relatively thick, clear sheet of ice and to sweep away impurities therein from the ice as it forms, breaking the advancing end of the ice sheet into fragments at a point in said space free of water, and submitting said broken fragments to pressure and under exclusion of air for forming a solid, clear, homogeneous mass of ice.

37. The method of preparing a bar of clear, hard, transparent, homogeneous ice, which comprises preparing hard, clear, ice fragments, arranging the fragments in a column and excluding air therefrom, subjecting each point in the column to increasing pressure whereby to render the fragments plastic at such point, and thereafter subjecting such point to a slowly and progressively decreasing pressure while maintaining the cross-section of the column substantially uniform, whereby to effect consolidation of the plastic fragments without explosive change of state of the mass after plasticizing and to produce a bar of predetermined cross-sectional form.

NORMAN H. GAY.